(12) United States Patent
Migliori (10) Patent No.: US 10,337,664 B2
(45) Date of Patent: Jul. 2, 2019

(54) CONNECTION OF TWO ADAPTER PARTS OF A SUPPORTING APPARATUS WHICH CAN BE CONSTRUCTED IN A MODULAR MANNER

(71) Applicant: UNIVER S.P.A., Milan (IT)

(72) Inventor: Luciano Migliori, Milan (IT)

(73) Assignee: UNIVER S.P.A., Milan (IT)

( * ) Notice: Subject to any disclaimer, the term of this patent is extended or adjusted under 35 U.S.C. 154(b) by 176 days.

(21) Appl. No.: 15/527,279

(22) PCT Filed: Jan. 5, 2016

(86) PCT No.: PCT/EP2016/050079
§ 371 (c)(1),
(2) Date: May 16, 2017

(87) PCT Pub. No.: WO2016/131555
PCT Pub. Date: Aug. 25, 2016

(65) Prior Publication Data
US 2018/0003337 A1 Jan. 4, 2018

(30) Foreign Application Priority Data
Feb. 19, 2015 (EP) .................................... 15155819

(51) Int. Cl.
*A01K 97/10* (2006.01)
*F16M 11/14* (2006.01)
(Continued)

(52) U.S. Cl.
CPC .......... *F16M 11/14* (2013.01); *B25J 15/0061* (2013.01); *F16C 11/106* (2013.01); *F16M 11/16* (2013.01); *F16M 11/2078* (2013.01)

(58) Field of Classification Search
CPC .... F16M 11/14; F16M 11/16; F16M 11/2078; B25J 15/0061; F16C 11/106
(Continued)

(56) References Cited

U.S. PATENT DOCUMENTS 4,531,855 A * 7/1985 Wallis ................... F16C 11/106
248/160
5,383,738 A * 1/1995 Herbermann ............... B25J 9/06
248/288.51
(Continued)

FOREIGN PATENT DOCUMENTS

EP 2778492 A1 9/2014
EP 3059462 A1 8/2016

OTHER PUBLICATIONS

European Patent Office, International Search Report, International Application No. PCT/EP2016/050079, dated May 2, 2016, 5 pages, Rijswijk, NL (The Netherlands); English language translation thereof.
(Continued)

Primary Examiner — Gwendolyn W Baxter
(74) Attorney, Agent, or Firm — Christopher C. Dremann, P.C.; Christopher C. Dremann (57) ABSTRACT

A connection of two adapter parts of a modularly-constructed supporting apparatus includes a first adapter part which has an end-side attachment with a partially spherical recess, a second adapter part which has an end-side spherical attachment for insertion into the partially spherical recess in the first adapter part and has a clamping ring which bears against the spherical attachment, on its half which is averted from the partially spherical recess, and a connecting clamp which engages behind the attachment and the clamping ring on sides which are averted from one another and also fixes the attachment and the clamping ring axially and radially in relation to one another, wherein the attachment and the clamping ring each have at least one weakening region for
(Continued)

deforming the attachment and the clamping ring when the connecting clamp acts on the attachment and the clamping ring. The connection is secure when tools, workpieces or the like of a relatively high weight are held by the supporting apparatus.

15 Claims, 11 Drawing Sheets

(51) Int. Cl.
*F16C 11/10* (2006.01)
*B25J 15/00* (2006.01)
*F16M 11/16* (2006.01)
*F16M 11/20* (2006.01)

(58) Field of Classification Search
USPC ......... 248/516, 229.14, 288.11, 288.31, 540; 403/90, 374.2
See application file for complete search history.

(56) References Cited

U.S. PATENT DOCUMENTS

| | | | |
|---|---|---|---|
| 5,660,366 A | 8/1997 | Palmer | |
| 6,328,269 B1 | 12/2001 | Krautloher | |
| 6,386,786 B1 | 5/2002 | Perlman et al. | |
| 6,938,865 B1* | 9/2005 | Day | B60R 11/02 |
| | | | 248/229.14 |
| 2008/0061195 A1* | 3/2008 | Carnevali | F16M 11/14 |
| | | | 248/125.8 |
| 2010/0178100 A1* | 7/2010 | Fricke | F16C 11/106 |
| | | | 403/90 |
| 2010/0181446 A1* | 7/2010 | Ziaja | F16M 11/14 |
| | | | 248/205.1 |
| 2014/0270909 A1 | 9/2014 | Oerder | |

OTHER PUBLICATIONS

European Patent Office, Written Opinion of the International Searching Authority, International Application No. PCT/EP2016/050079, dated May 13, 2016, 5 pages, Munich, DE (Germany); English language translation thereof.

* cited by examiner

CONNECTION OF TWO ADAPTER PARTS OF A SUPPORTING APPARATUS WHICH CAN BE CONSTRUCTED IN A MODULAR MANNER

CROSS-REFERENCE TO RELATED APPLICATIONS

This application is the United States national stage non-provisional utility patent application of International Application No. PCT/EP2016/050079 filed on Jan. 5, 2016, which claims priority to European Patent Application No. 15155819.4 filed on Feb. 19, 2015, the disclosures of which are incorporated herein by reference.

FIELD OF THE INVENTION

The invention relates to a connection of two adapter parts of a modularly constructable apparatus for the support of tools, workpieces or the like.

BACKGROUND AND RELATED ART

Supporting apparatuses serve in particular for attachment to robot arms and for linkage of tools, such as clamping, gripping, suction devices and other appliances, such as valves, sensors or the like. In this context, use is made of rod parts, which are connectable by means of adapters.

A connection of two adapter parts of a modularly constructable supporting apparatus is described in EP 2 778 492 A1. In this connection, the respective adapter part has a protrusion. In addition, a connecting clamp, which back-grips the mutually facing protrusions on mutually opposing sides of the protrusions and secures the protrusions axially and radially relative to one another, is provided. On their mutually facing sides, the protrusions are of flat configuration and of circular design. Under the action of the connecting clamp, the two protrusions are braced one against the other. The connecting clamp has two legs, which are articulately connected to each other. In the region of those ends of the legs which are facing away from the joint, the connecting clamp has means for connecting the two legs when the legs are in the closed position.

Connections of two adapter parts of a modularly constructable supporting apparatus for the support of tools, workpieces or the like are known from practice, in which connections one of the adapter parts has a spherical protrusion which is clampingly held in a connecting clamp of the other adapter part. A thus designed ball linkage is not suitable for providing large connecting forces of the two adapter parts, so that this connection is suitable only for modularly constructable supporting apparatuses in which the tools, workpieces or the like have a relatively low weight.

OBJECTS AND SUMMARY OF THE INVENTION

The object of the present invention is to provide a connection of two adapter parts of a modularly constructable supporting apparatus for the support of tools, workpieces or the like, with which connection relatively large weights of the supporting apparatus can be reliably absorbed.

The object is achieved by a connection of two adapter parts which is configured according to the present invention in the various embodiments shown and described herein, as well as equivalents thereto.

The connection according to the invention has a first adapter part, a second adapter part, and a connecting clamp for connecting the two adapter parts. The first adapter part is herein provided with an end-side protrusion having a partially spherical recess. The second adapter part is provided with an end-side spherical protrusion for insertion into the partially spherical recess in the first adapter part and with a clamping ring which bears against the spherical protrusion. This clamping ring bears against the spherical protrusion on that half thereof which is facing away from the partially spherical recess. The connecting clamp back-grips the protrusion of the first adapter part and the clamping ring of the second adapter part on mutually opposing sides. The connecting clamp here secures the protrusion of the first adapter part and the clamping ring of the second adapter part radially and axially relative to each other. The protrusion of the first adapter part and the clamping ring of the second adapter part respectively have at least one weakening region for the deformation of the protrusion of the first adapter part, and also the clamping ring, when these are acted on by means of the connecting clamp.

This inventive connection of the two adapter parts enables, on the one hand, an accurate positioning of the two adapter parts relative to each other, to be precise in different angular positions due to the interaction of spherical protrusion and partially spherical recess. On the other hand, the weakening regions in the protrusion of the first adapter part and in the clamping ring result in these components becoming more elastic and being able to adapt when acted on by the connecting clamp. The two adapter parts can thus be frictionally connected to each other with particularly high efficiency, with the consequence that they are particularly suitable for absorbing relatively high torques which are to be transmitted between these. The supporting apparatus can hence be furnished with tools, workpieces or the like which have a relatively large weight. Where ball linkages are used, the supporting apparatus is suitable not only for light elements which do not require such accurate positioning, for instance for proximity switches or suction devices, but also, in particular, as a linkage for gripper frames, preferably in a press plant.

According to a preferred embodiment of the invention, it is provided that the recess in the first adapter part is of hemispherical configuration. The spherical protrusion of the second adapter part is in particular configured as a ball, apart from the discrete region in which the ball is fastened. As a result of these designs, relatively large contact surfaces, which are the basis for the transmission of the friction forces and the resultant torques, can be realized.

Preferably, also the contact surfaces of spherical protrusion and clamping ring are matched to each other. This enables relatively high forces to be transmitted from the clamping ring into the spherical protrusion under the action of the connecting clamp.

According to another preferred embodiment of the invention, it is provided that, in the connection, the protrusion of the first adapter part and the clamping ring respectively have a plurality of weakening regions. These plural weakening regions enable a particularly elastic configuration of the protrusion of the first adapter part and of the clamping ring. The clamping forces or clamping torques to be transmitted can hereby be optimized.

In particular, the connection is refined such that the protrusion of the first adapter part has weakening regions, which are configured as one or more slots in the protrusion, wherein the respective slot in the protrusion extends perpendicular to the plane of action of the connecting clamp.

The respective slot in the first protrusion thus extends in a direction from the connection region of the two adapter parts away into the protrusion of the first adapter part. As a result of this extent, a further optimization of the elasticity of the protrusion of the first adapter part is realized.

It is in particular provided that the respective slot extends perpendicular to the plane of action of the connecting clamp through to outside the range of action of the connecting clamp on the protrusion of the first adapter part. The respective slot thus extends over a relatively large depth of the protrusion of the first adapter part, through to outside the range of action of the connecting clamp on the protrusion.

Preferably, the respective slot extends, perpendicular to the plane of action of the connecting clamp, over the entire depth of the partially spherical recess.

According to another preferred embodiment, it is provided that the respective slot extends radially from the partially spherical recess in the first adapter part through to the radially outer limit of the first adapter part, related to its contact region with the connecting clamp. This configuration of the respective slot also contributes to the increased elasticity of the first adapter part in the region of the spherical recess.

It is regarded as particularly advantageous if the deformation of the first adapter part in the region of the partially spherical recess occurs evenly. This ensures that, in the whole of the region of the partially spherical recess, this acts with almost identical surface pressure on the spherical protrusion of the second adapter part when the connecting clamp acts on the clamping ring. From this viewpoint, it is in particular provided that adjacent slots of the first adapter part are arranged at the same circular angle to one another. In particular four slots are provided, which slots are thus arranged at a circular angle of 90° to one another.

It is regarded as advantageous if the protrusion of the first adapter part has on its side facing the second adapter part a flat surface, and the clamping ring of the second adapter part has on its side facing the protrusion of the first adapter part a flat surface, wherein these flat surfaces are arranged parallel to each other, in particular the two adapter parts make contact with each other in the region of these surfaces. This design enables the transmission of particularly high forces between the two adapter parts.

A further embodiment of the invention, which relates to the configuration of the clamping ring, provides that the clamping ring is interrupted in an annular region of the clamping ring by means of a radially extending slot. The clamping ring is thus radially split, hence weakened in this region, and under the action of the clamping force of the connecting clamp can adapt in diameter, in concrete terms under the action of the connecting clamp can reduce in diameter, for the purpose of clamping between the connecting clamp and the at least circular protrusion of the second adapter part.

A design of the clamping ring in which the clamping ring has a weakening region formed by at least one slot in the clamping ring, which slot extends over a part of the radial thickness of the clamping ring, is regarded as particularly advantageous. In particular, this radially extending slot is provided additionally to the above-described slot interrupting the clamping ring. Thus, in the region of the clamping ring are configured a plurality of weakening points, by which an elastic deformation of the clamping ring, which is important for the transmission of forces and torques, can be ensured.

From the viewpoint of optimized elasticity of the clamping ring, it is regarded as particularly advantageous if, in said weakening region having the slots extending over a part of the radial thickness of the clamping ring, a plurality of, in particular two slots are formed, wherein one slot projects from radially inside into the clamping ring and the other slot projects from radially outside into the clamping ring. This design too helps to increase the elastic deformability of the clamping ring.

In particular, the slot interrupting the clamping ring and at least one further slot of the clamping ring are arranged diametrically. In particular, it is provided that the slots in the clamping ring extend over its axial extent.

In order to be able to optimally transmit connecting forces between the two adapter parts, the clamping ring, at least behind the crown region of the ball of the protrusion of the second adapter part, related to that half which is facing away from the end-side protrusion of the first adapter part, bears against the spherical protrusion of the second adapter part. From the viewpoint of the weakening regions of first adapter part and clamping ring, which enable their elastic deformation, the clamping ring can perfectly well extend into the other region, thus the region, facing the first adapter part, before the crown of the ball of the partially spherical protrusion.

Further features of the invention are shown and described by the description of the figures and the figures themselves, wherein it is noted that all single features and all combinations of single features may be incorporated in one or more embodiments of the invention.

BRIEF DESCRIPTION OF THE DRAWING FIGURES

In the accompanying drawing figures, the invention is described on the basis of an exemplary embodiment of a supporting apparatus which has various adapter parts respectively connected in pairs, without the invention being limited to the described exemplary embodiment.

DETAILED DESCRIPTION OF EMBODIMENTS OF THE INVENTION

Figure 1:
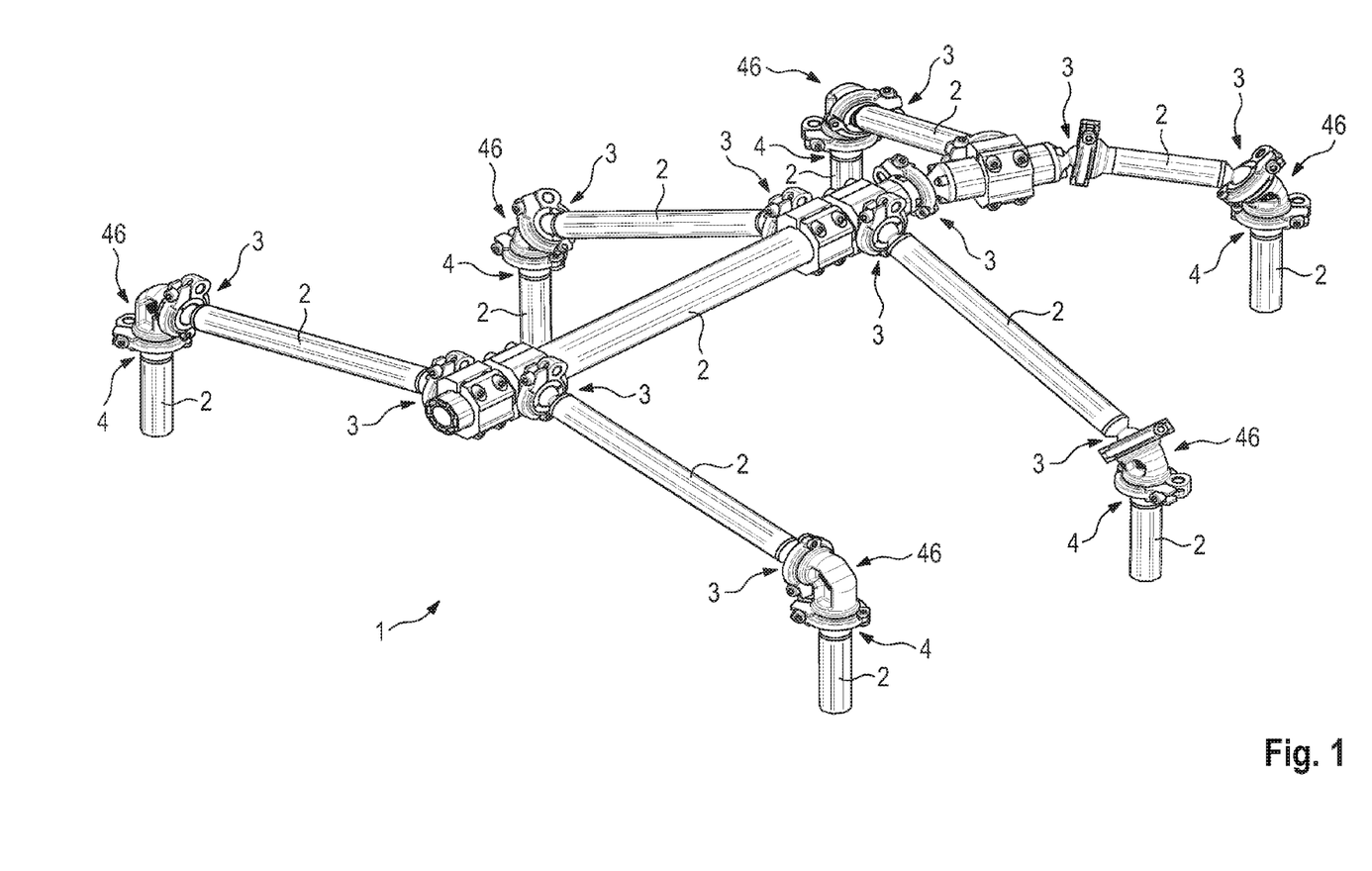
FIG. 1 shows a supporting apparatus constructed from individual modules, illustrated in a three-dimensional representation.

FIG. 1 shows a modularly constructed supporting apparatus 1 for the support of tools, workpieces or the like. This supporting apparatus 1 is used in particular in the automotive industry sector.

The supporting apparatus 1 has a multiplicity of rods 2, which are connected to one another by means of adapter parts. Rods 2, which due to the configuration of the adapter parts interact with these, can herein be arranged at different angle to one another, in accordance with the concrete requirements regarding the placement of the tools, workpieces or the like.

The respective adapter pair, which is formed by two adapter parts which interact with each other and allow an arrangement of the adapter parts in different angular position relative to each other, is denoted by the reference numeral 3. Other adapter pairs, in which the adapter parts are not optionally positionable relative to each other, are denoted by the reference numeral 4. The connection of these adapter parts of the adapter pairs 4 is realized as described in EP 2 778 492 A1.

In the region of various rods 2, the fastening of the tools, workpieces or the like is realized according to the demands which are placed on the modularly constructed supporting apparatus 1.

Figure 2:
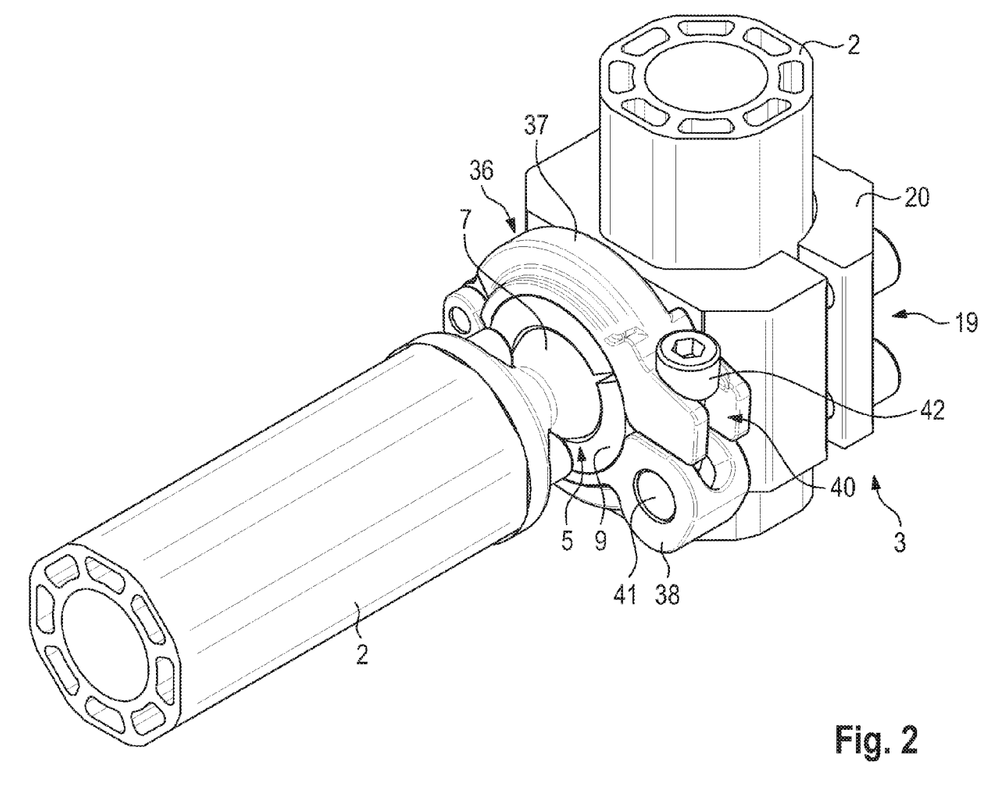
FIG. 2 shows a portion of the supporting apparatus according to FIG. 1, with illustrated connection of two adapter parts, shown in a three-dimensional representation.

FIG. 2 illustrates an adapter pair 3 for connecting two rods 2. The respective rod 2 is configured as an extruded profile, in particular consisting of aluminum, and has a polygonal, controlled cross section.

Figure 3:
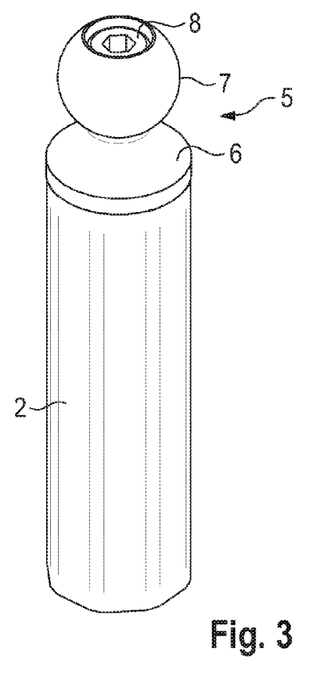
FIG. 3 shows one of the adapter parts without the clamping ring, illustrated in a three-dimensional representation.

As can be seen from the representation of FIG. 3, to the rod 2 is connected a part of an adapter part 5. This has a base 6, which is placed into the rod 2 and is fixedly connected thereto. This connection can be realized in different ways, for instance by pressing of the base 6 into the rod 2 or screwing of the base 6 to the rod 2. Also a component part of this part of the adapter part 5 is a spherical protrusion 7, which is screwed to the base 6 by means of a screw 8. To this end, the spherical protrusion 7, on the side facing away from the base 6, has a recess for receiving a head of the screw 8. The rod 2 can have any chosen length in accordance with the requirements associated with the attachment of one or more tools, workpieces or the like to the rod 2.

Figure 4:
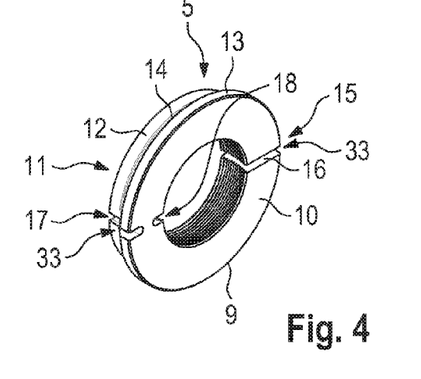
FIG. 4 shows the clamping ring of this adapter part, illustrated in a three-dimensional representation.

A component part of the adapter part 5 is further formed by a clamping ring 9, which is illustrated in FIG. 4. Aside from the modifications yet to be described in detail, this is configured as a rotationally symmetrical body, having parallel end faces 10, 11 and, with respect to the longitudinal center axis of the clamping ring 9, axially parallel peripheral surfaces 12, 13, wherein the peripheral surface 13 adjoins the end faces 10 and the peripheral surface 12 adjoins the end face 11. The outer radius of the peripheral surface 13 is in this case greater than that of the peripheral surface 12. Between the two peripheral surfaces 12, 13, the clamping ring 9 has a conically widening peripheral surface 14. The clamping ring 9 which has so far been described is interrupted in an annular region 15 by means of a radially extending slot 16. The clamping ring 9 further has, diametrically to the slot 16, two further slots, namely a radially outer slot 17 and a radially inner slot 18. The slots 17, 18 extend over the whole of the thickness of the clamping ring 9, thus over the extent of the clamping ring 9 in its axial direction.

The slot 17 projects from radially outside into the clamping ring 9, and the slot 18 from radially inside into the clamping ring 9.

The weakened configuration of the clamping ring 9 due to the slot 16 allows the clamping ring 9 to be elastically deformed in such a way that the end faces of the clamping ring 9 which are located in the region of the slot 16 come closer together, to the point of their contact, when a force is applied to the clamping ring 9. This elastic deformation of the clamping ring 9 is simplified by the additional weakening of the clamping ring 9 in the region of the slots 17, 18.

Figure 5:
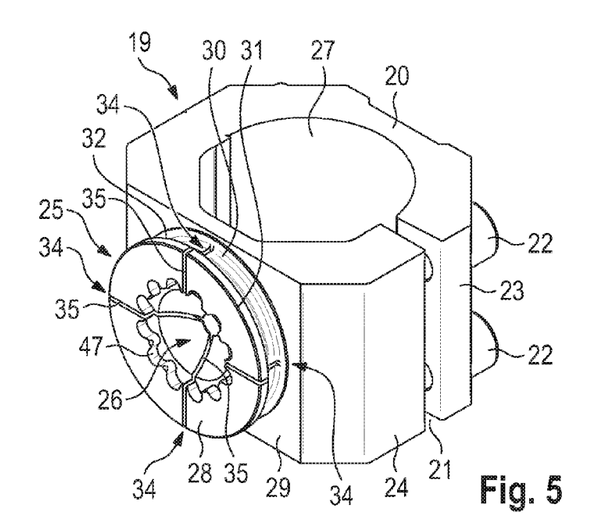
FIG. 5 shows the other adapter part, illustrated in a three-dimensional representation.

FIG. 5 illustrates the other adapter part 19 of the adapter pair 3. The adapter part 19 has a passage for receiving a rod 2. A basic portion 20 of the adapter part 19 is provided with a slot 21. In the region of this slot 21, two screws 22 pass through a leg 23 of the adapter part 19 and are screwed into threaded bores of another leg 24 of the adapter part 19. Through tightening of the screws 22, a rod placed into the basic portion 20 can be braced with the adapter part 19 in an optional axial position of the rod 2.

A component part of the adapter part 19 is further formed by an end-side protrusion 25, which has a partially spherical recess 26. The protrusion 25 is essentially of disk-shaped design and has an end face 28 facing away from the receptacle 27 for the rod 2. This end face is arranged parallel to an end face 29 of the basic portion 20. The outer diameter of the protrusion 25 in the region of the end face 28 corresponds to the outer diameter of the clamping ring 9 in the region of its end face 10. Starting from the end face 28, peripheral surfaces 30, 31, which are axially parallel with respect to the protrusion 25 and the outer diameter of which corresponds to the outer diameter of the peripheral surfaces 12 and 13 of the clamping ring 9, are configured in the protrusion 25. In accordance with the conically arranged peripheral surface 14 of the clamping ring 9, the protrusion 25 has a conical peripheral surface 32, which connects the peripheral surfaces 30 and 31 one to the other.

Not only does the clamping ring 9 have the weakening regions 33, by virtue of the slot 16 and the slots 17, 18, but the protrusion 25 too is provided with weakening regions 34. For the formation of these weakening regions 34 the protrusion 25 has four slots 35, which are identically configured and extend from the end face 28 to close to the end face 29 of the basic portion 20. Related to the total circle of the protrusion 25, adjacent slots assume an angle of 90° to each other. The respective slot 35 in the protrusion 25 extends perpendicular to the plane of action of a connecting clamp to be described in greater detail below, thus perpendicular to the end face 28 of the protrusion 25. In detail, the respective slot 35 extends over the whole of the depth of the partially spherical recess 26. Radially, the respective slot 35 extends from the partially spherical recess 26 through to the radially outer limit of the protrusion 25, thus opens out into the peripheral surface 31.

The configuration of the protrusion 25 with the four slots 35 enables an elastic deformation of the protrusion 25 when this is acted on by fastening forces for the connection of the two adapter parts 5, 19.

The assembly of the two adapter parts 5, 19 for the creation of the connection according to FIG. 2 is described in FIGS. 6 to 11.

Figure 6:
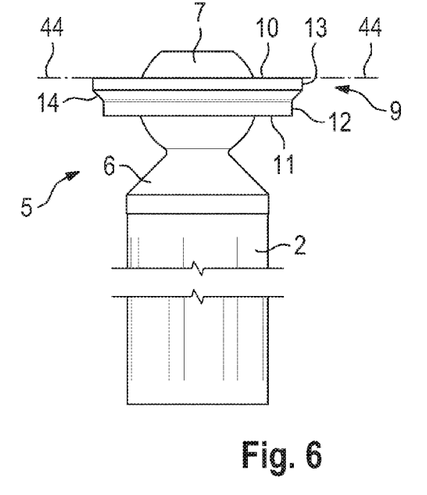
FIG. 6 shows one adapter part, shown with clamping ring in contact with the spherical protrusion of this adapter part, illustrated in a side view.
Figure 7:
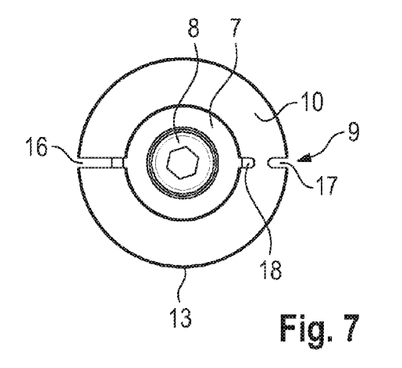
FIG. 7 shows the arrangement according to FIG. 6, illustrated in a-face view.
Figure 8:
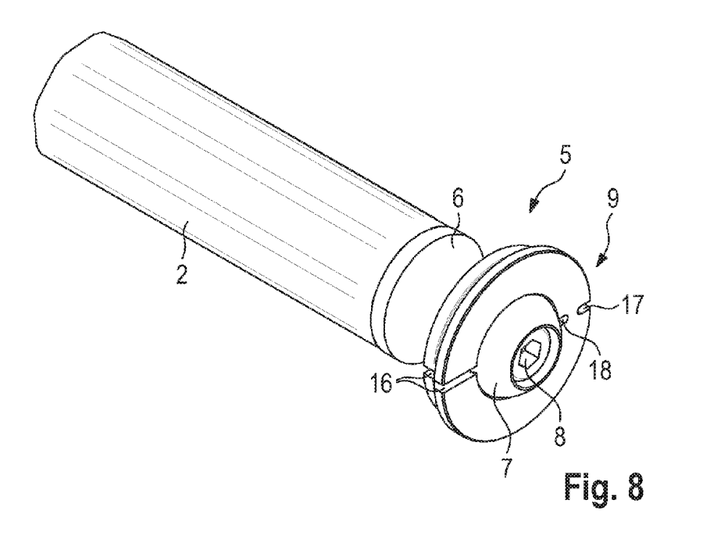
FIG. 8 shows the arrangement according to FIG. 6 and FIG. 7, illustrated in a three-dimensional representation.

In FIGS. 6 to 8 is illustrated that firstly the adapter part 5 is formed by placement of the clamping ring 9 onto the spherical protrusion 7. In order to be able to transmit forces from the clamping ring 9 to the spherical protrusion 7 in the region of that side of the protrusion 7 which is facing the base 6, the clamping ring 9 is configured such that and is configured in such a way that the clamping ring 9 bears against the spherical protrusion 7 on that half thereof which is facing the base 6. The clamping ring 9 also comes to bear in the crown region of the spherical protrusion 7 and extends over this crown region, as can be seen, in particular, from the representation of FIG. 6.

The spherical protrusion 7 is matched with respect to its outer contour to the inner contour of the partially spherical recess 26, so that the protrusion 7, once the connection is assembled, makes full-faced contact with the recess 26.

Figure 9:
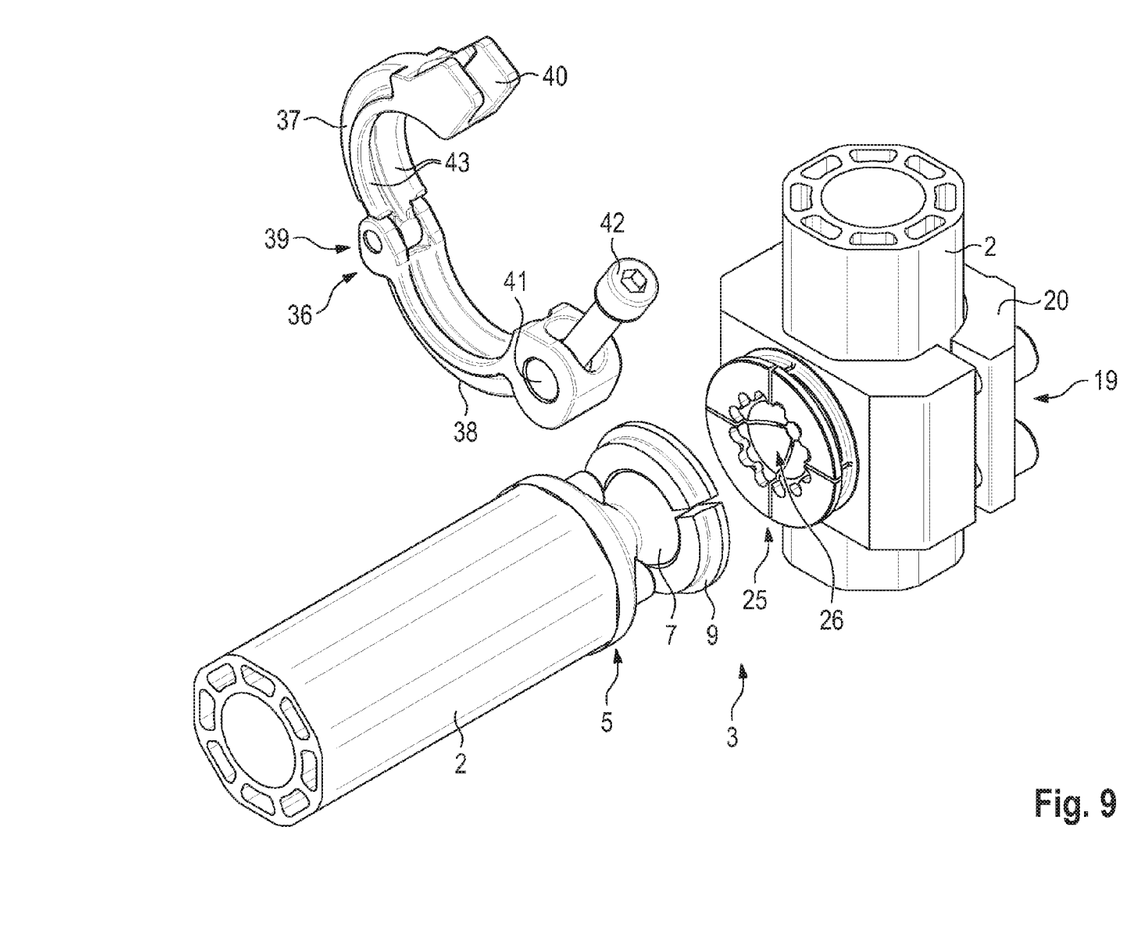
FIGS. 9 to 11 show assembly steps for the connection of the two adapter parts.

The adapter part 5 pre-assembled according to the representation of FIGS. 6 to 8 is subsequently brought into position relative to the adapter part 19, as is illustrated in FIG. 9.

For the axial and radial securement of the adapter parts 5, 19 in variable angular position relative to each other by virtue of the ball joint, a connecting clamp 36 is provided. This has two legs 37, 38. The two legs are connected to each other by means of a joint 39. In the region of its end facing away from the joint 39, the leg 37 has a U-shaped bearing lug 40. In the region of its end facing away from the joint 39, the other leg 38 pivotably receives a bearing bolt 41, in which is made a threaded bore (not illustrated), into which a screw 42 configured as a hexagon socket screw is screwed. When the connecting clamp 36 is in the closed position, when the legs 37, 38 are pivoted toward each other, the screw 42 is pivoted into the U-shaped bearing lug 40 and the head of the screw 42 there back-grips the leg 37. By tightening of the screw 42, the legs 37, 38 of the connecting clamp 36 are moved closer together and thus serve to connect the clamping ring 9, and thus the spherical protrusion 7, to the protrusion 25, whereupon the spherical protrusion 7 makes contact with the partially spherical recess 26.

Based on the representation in FIG. 9, the adapter part 5 is thus placed with the spherical protrusion 7 into the partially spherical recess 26 of the adapter part 19. After this, the opened connecting clamp 36, in the region of the peripheral surface 14 of the clamping ring 9 and the peripheral surface 32 of the protrusion 25, is applied to these, wherein contact surfaces 43 of the legs 37, 38 are inclined in accordance with the clamping faces—peripheral surfaces 14, 32 of clamping ring 9 and protrusion 25, respectively—and bear against these. Once the connecting clamp 36 is closed and the screw 42 is tensioned, the connecting clamp 36 increasingly closes, whereby the effective diameter in the plane of action 44 of the connecting clamp 36 slightly reduces and the latter hence applies a pressure to the peripheral surfaces 14, 32 via the contact surfaces 43, with the result that the adapter parts 5, 19 provided with the slots 16 to 18 and 35, respectively, are elastically deformed. Prior to this tightening of the screw 42, the two adapter parts 5 and 19 are oriented in the desired position via the ball joint.

Figure 10:
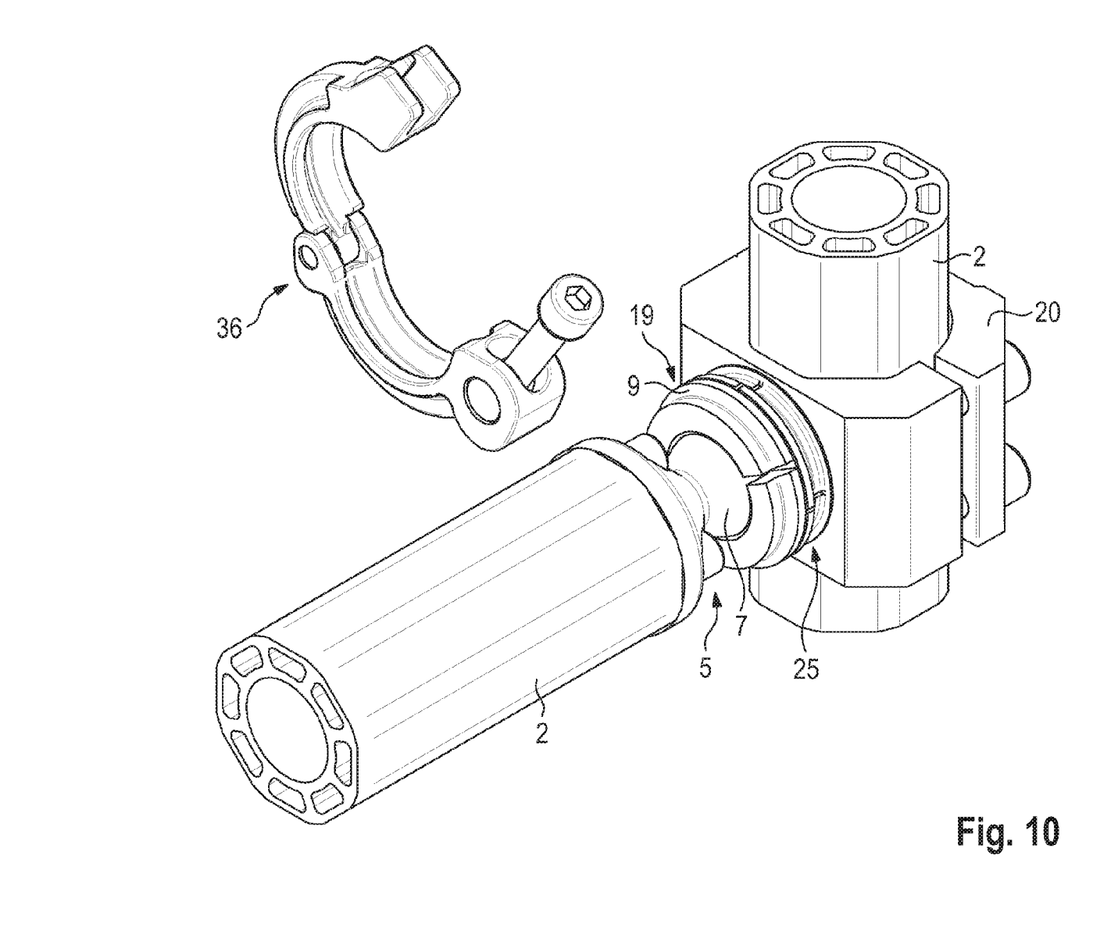
Figure 11:
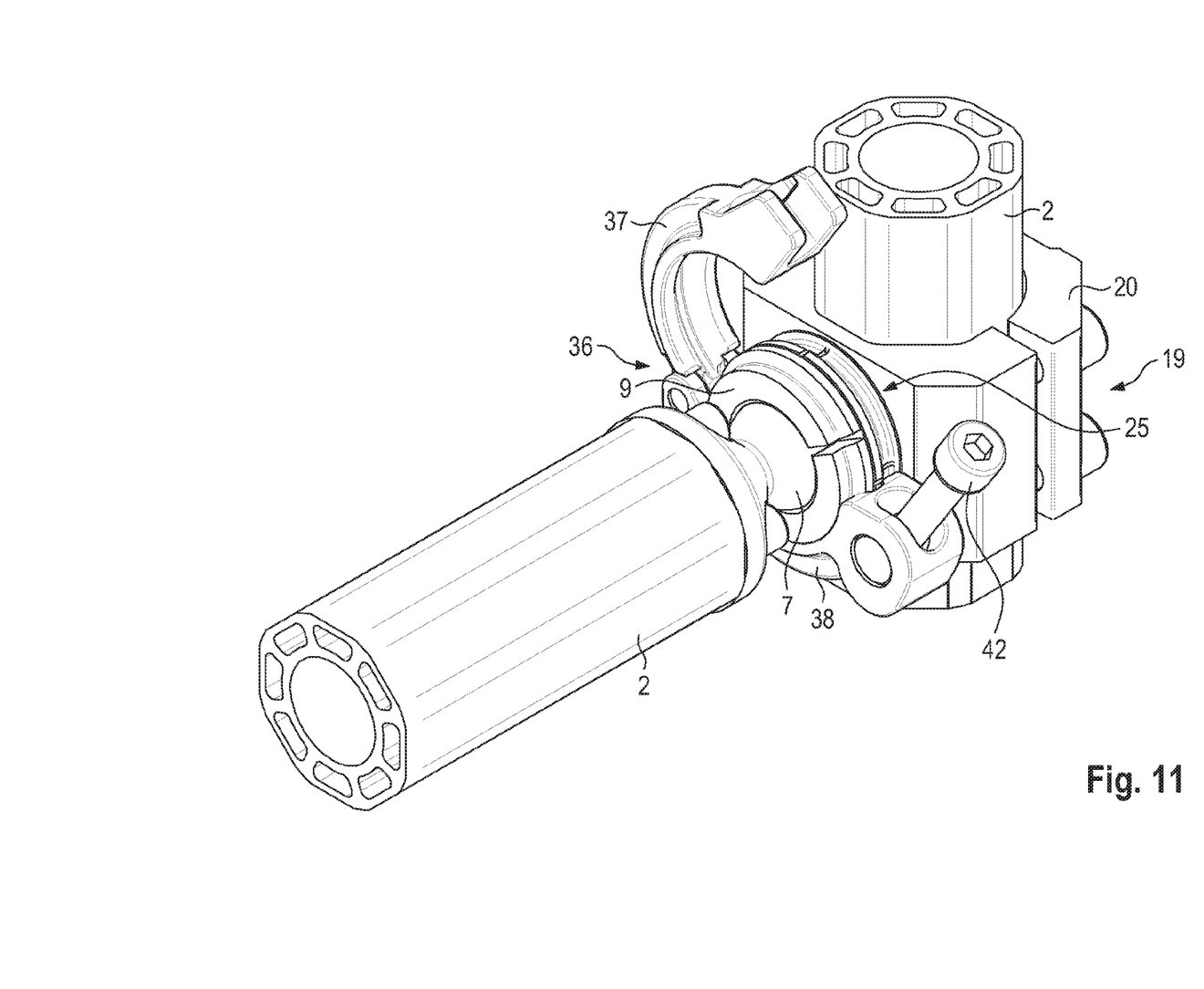

As a result of the elastically resilient configuration of the adapter parts 5, 19 in the region of their slots 16 to 18 and 35, respectively, a high clamping force between the two adapter parts 5, 19 can be achieved, and thus high moments can be transmitted between the adapter parts by virtue of the fixed ball connection.

Figure 12:
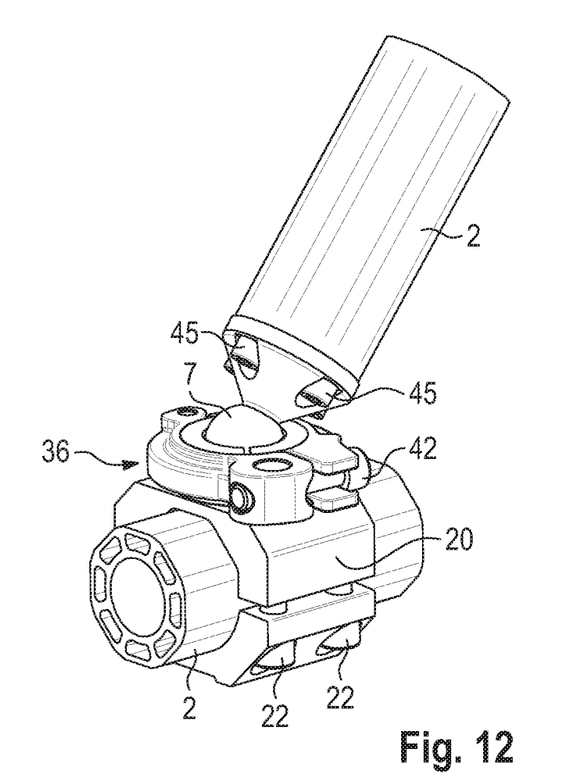
FIG. 12 shows that connection of the two adapter parts which is shown in FIG. 2, shown in a different angular position of the adapter parts relative to each other.
Figure 13:
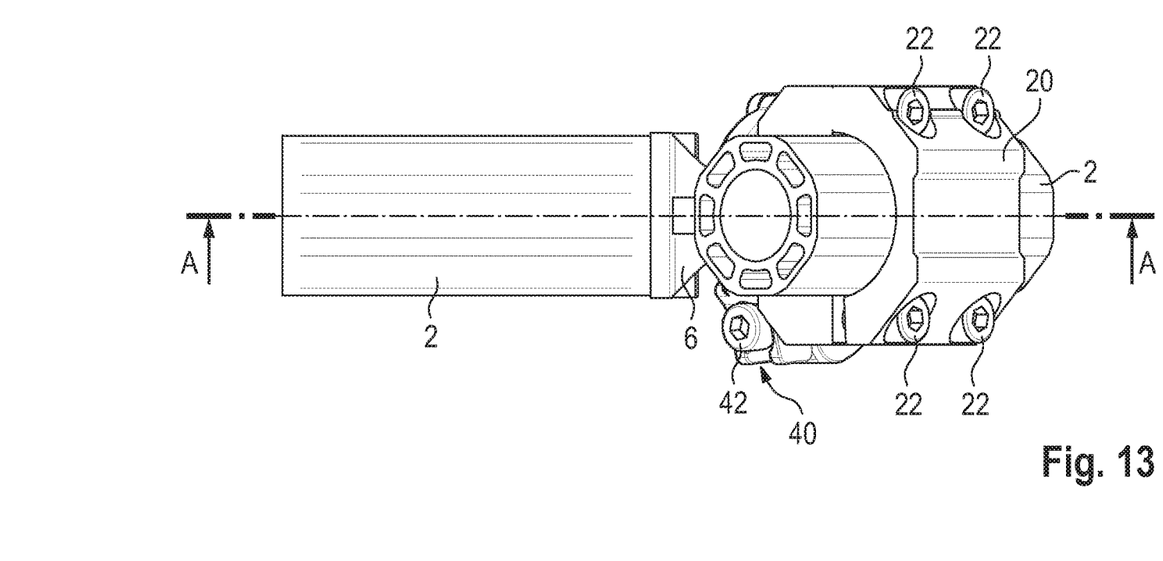
FIG. 13 shows a top view of the connection shown in FIG. 12.
Figure 14:
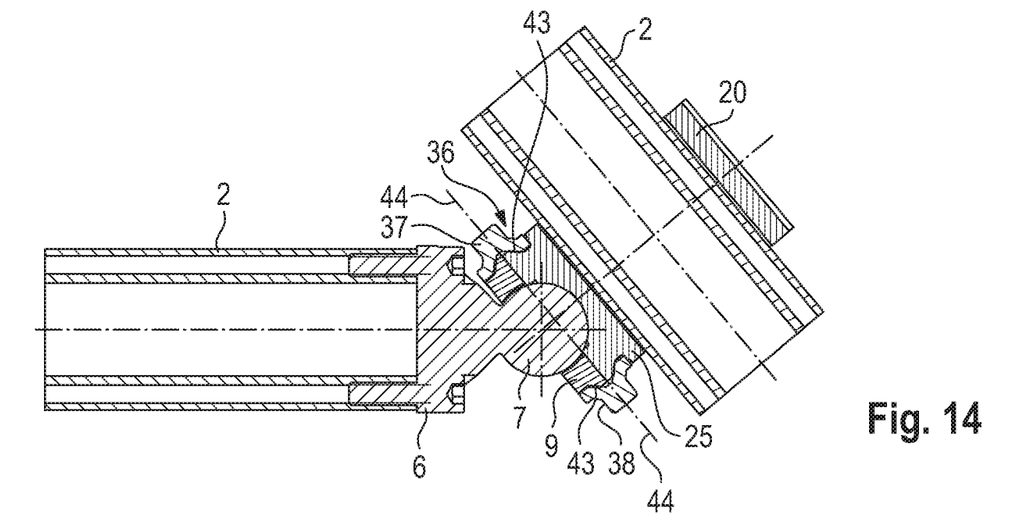
FIG. 14 shows a section through the connection along the line A-A in FIG. 13.

FIGS. 12 to 14 illustrate a modified arrangement of mutually connected adapter parts 5, 19. The adapter parts are connected in an obtuse angular position relative to each other. Also the base 6 is screwed to the rod 2 by means of four screws 45. For the rest, this embodiment is designed in accordance with the previously described embodiment. In this respect, reference is made to the aforementioned reference numerals, which are used for this embodiment also.

Figure 15:
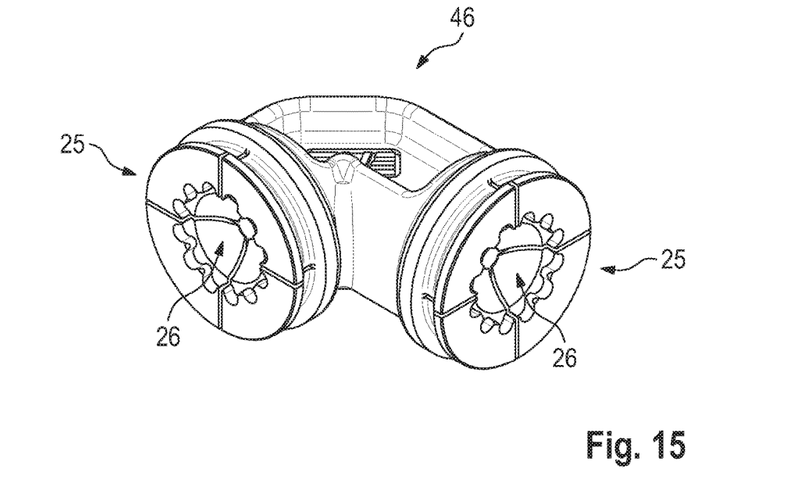
FIG. 15 shows a modified adapter part used in the supporting apparatus according to FIG. 1, shown in a three-dimensional representation.

FIG. 15 illustrates an adapter part 46 which is modified in relation to the adapter part 19 and which is used in the supporting apparatus 1 according to FIG. 1, yet has two protrusions 25 having partially spherical recesses 26. This adapter part 46 thus serves for the connection to two adapter parts, here in the region of one protrusion 25, for the connection to the adapter part 5 with a view to the adapter pair 3, while in the region of the other protrusion 25 a non-angle-variable linkage to an adapter part according to the adapter pair 4 is realized.

The described configuration of a protrusion 25 thus enables both the articulated linkage of the adapter part 5 with the spherical protrusion 7 and the non-articulated linkage of an adapter part which has a protrusion configured according to the protrusion 25. In this case, the wavy depressions 47 serve to receive a disk (not shown) which serves as an anti-rotation mechanism and is inserted into the depressions 47 of both interacting protrusions 25, as is described in connection with EP 2 778 492 A1.

By virtue of the kink in the adapter part 46, the design of the adapter part 46 enables rods 2 assigned to this adapter part 46 to be arranged at a more acute angle than when an adapter part 19 is used.

That which is claimed is:

1. A connection of first and second adapter parts of a modularly-constructed supporting apparatus, the connection comprising a first adapter part, which has an end-side protrusion having a partially spherical recess, and a second adapter part, which has an end-side spherical protrusion for insertion into the partially spherical recess of the first adapter part, and a clamping ring, which bears against the spherical protrusion on a half of the spherical protrusion which is facing away from the partially spherical recess of the first adapter part, and a connecting clamp, which back-grips the protrusion of the first adapter part and the clamping ring of the second adapter part on mutually opposing sides and secures said protrusion and said clamping ring axially and radially relative to each other, wherein the protrusion of the first adapter part and the clamping ring of the second adapter part each have at least one weakening region for the deformation of the protrusion of the first adapter part and the clamping ring of the second adapter part when the first adapter part and the second adapter part are acted on by the connecting clamp.

2. The connection as claimed in claim 1, wherein the partially spherical recess of the first adapter part is configured as a hemisphere.

3. The connection as claimed in claim 1, wherein a contact surface of the partially spherical recess of the first adapter part and a corresponding contact surface of the spherical protrusion of the second adapter part are matched to each other, and wherein a contact surface of the spherical protrusion of the second adapter part and a corresponding contact surface of the clamping ring of the second adapter part are matched to each other.

4. The connection as claimed in claim 1, wherein the protrusion of the first adapter part and the clamping ring of the second adapter part each have a plurality of weakening regions.

5. The connection as claimed in claim 4, wherein the weakening regions of the protrusion of the first adapter part are configured as one or more slots in the protrusion, and wherein each of the slots in the protrusion extends perpendicular to a plane of action of the connecting clamp.

6. The connection as claimed in claim 5, wherein each of the slots in the protrusion extends perpendicular to the plane of action of the connecting clamp through to outside a range of action of the connecting clamp on the protrusion of the first adapter part.

7. The connection as claimed in claim 5, wherein each of the slots in the protrusion extends, perpendicular to the plane of action of the connecting clamp, over the entire depth of the partially spherical recess.

8. The connection as claimed in claim 5, wherein each of the slots in the protrusion extends radially from the partially spherical recess in the first adapter part through to the radially outer limit of the first adapter part.

9. The connection as claimed in claim 5, wherein adjacent ones of the slots in the protrusion are arranged at a circular angle of about 90° to one another.

10. The connection as claimed in claim 1, wherein the protrusion of the first adapter part has on a side facing the second adapter part a first flat surface, and the clamping ring of the second adapter part has on an opposing side facing the protrusion of the first adapter part a second flat surface, and wherein the first and second flat surfaces are arranged parallel to each other such that the first and second adapter parts make contact with each other in a region of the first and second flat surfaces.

11. The connection as claimed in claim 1, wherein the clamping ring of the second adapter part is interrupted in an annular region by a radially extending slot.

12. The connection as claimed in claim 11, wherein the slot interrupting the clamping ring of the second adapter part and at least one other slot in the clamping ring are arranged diametrically.

13. The connection as claimed in claim 12, wherein the slot interrupting the clamping ring of the second adapter part and the at least one other slot in the clamping ring extend over an axial extent of the clamping ring.

14. The connection as claimed in claim 1, wherein the clamping ring of the second adapter part has a weakening region formed by at least one slot in the clamping ring, and wherein the slot extends over at least a part of the radial thickness of the clamping ring.

15. The connection as claimed in claim 14, wherein, in the weakening region of the clamping ring, a plurality of slots are formed in the clamping ring, and wherein at least one of the slots projects from radially inside into the clamping ring-and at least one other of the slots projects from radially outside into the clamping ring.

* * * * *